Figure 1:
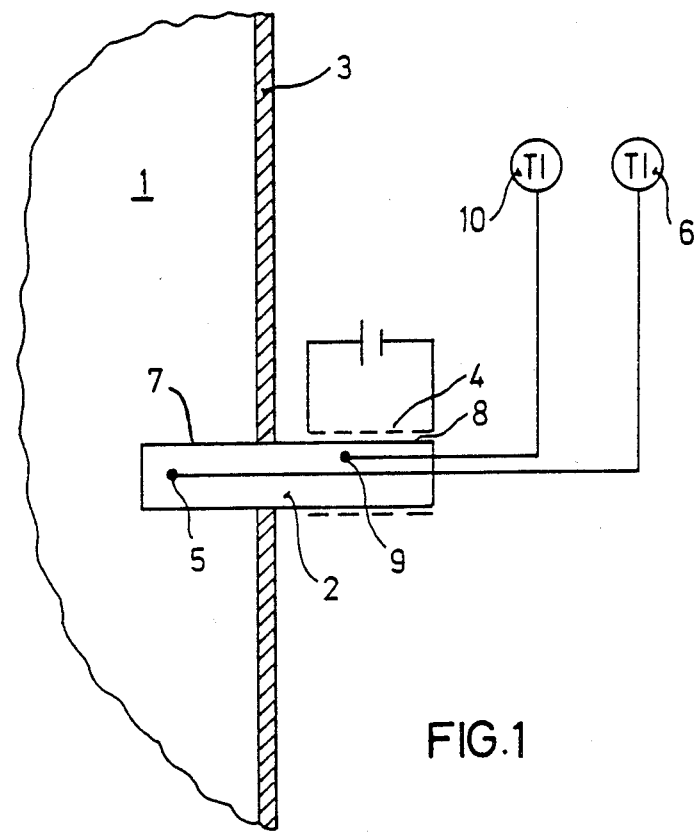

United States Patent [19]

Schlindwein et al.

[11] Patent Number: 4,583,401

[45] Date of Patent: Apr. 22, 1986

[54] METHOD AND APPARATUS FOR MEASURING THE LEVEL OF LIQUIDS OR AGITATED CHARGES IN VESSELS

[75] Inventors: Heinz Schlindwein, Birkenheide; Wolfgang Rühenbeck, Birkenau, both of Fed. Rep. of Germany

[73] Assignee: BASF Aktiengesellschaft, Ludwigshafen, Fed. Rep. of Germany

[21] Appl. No.: 554,325

[22] Filed: Nov. 22, 1983

[30] Foreign Application Priority Data

Nov. 30, 1982 [DE] Fed. Rep. of Germany ....... 3244269

[51] Int. Cl.$^4$ .............................................. G01F 23/22
[52] U.S. Cl. ...................................... 73/295; 340/622
[58] Field of Search ............... 73/295; 374/29.45; 340/622

[56] References Cited

U.S. PATENT DOCUMENTS

| | | | |
|---|---|---|---|
| 2,279,043 | 5/1942 | Harrington | 73/295 |
| 2,931,224 | 4/1960 | Anderson | 73/295 |
| 3,279,252 | 10/1966 | Barlow | 73/295 |
| 3,955,416 | 5/1976 | Waiwood | 73/295 |
| 4,307,606 | 12/1981 | Johnson | 73/295 |
| 4,319,233 | 3/1982 | Matsuoka et al. | 73/295 |
| 4,461,175 | 7/1984 | Baumgart et al. | 73/295 |

*Primary Examiner*—Charles Frankfort
*Assistant Examiner*—Thomas B. Will
*Attorney, Agent, or Firm*—Keil & Weinkauf

[57] ABSTRACT

At the point or points in a vessel (1) at which the liquid or agitated charge level is to be monitored, a heat stream is fed into or out of the interior of the vessel (1) via a heat-conducting element (2) which is in thermal contact with the interior of the vessel (1) on the one hand and with a heat source or cold source (4) on the other hand. In order to indicate the level, the change in the heat stream when the liquid or agitated charge comes into contact with the elements (2) is determined by measuring the temperature of the element in the region of contact by means of a temperature sensor (5).

1 Claim, 2 Drawing Figures

METHOD AND APPARATUS FOR MEASURING THE LEVEL OF LIQUIDS OR AGITATED CHARGES IN VESSELS

Another measurement principle is based on the effect of the moving particles on mechanically moved components, such as tuning fork probes or vane probes, but this is unsuccessful if the difference between the density of the agitated particle bed and that of the gas space is small, as is the case for greatly expanded beds of fine particles. For the same reason, the radioactive method of level measurement developed in the past few years is also unsuccessful in this case. The latter measurement also has other disadvantages, namely the large amount of space required by the apparatus and the expensive safety precautions required for handling the radioactive substance.

It is an object of the present invention to provide a method and an apparatus for measuring the level of liquids or agitated charges in vessels, which method and apparatus are more universally applicable than the conventional methods with regard to the operating parameters and the particle sizes of the substances whose level is to be monitored.

In accordance with the invention there is provided a method for measuring the level of a liquid or an agitated charge in a vessel, wherein a heat stream is fed into or out of the interior of the vessel via a heat-conducting element at the point or points at which the liquid or charge level is to be monitored, and, in order to indicate the level, the change in this heat stream when the liquid or charge comes into contact with the element is determined by measuring the temperature of the element in the region where contact occurs.

The present invention furthermore provides an apparatus for measuring the level of liquids or agitated charges in vessels, comprising one or more elements which consist of heat-conducting material, are located at the point or points at which the liquid or charge level is to be monitored, are in thermal contact with the interior of the vessel on the one hand and with a heat source or cold source on the other hand, and are equipped, at the end in the vessel, with a temperature sensor connected to a display.

Embodiments of the invention are shown diagrammatically in the accompanying drawings and described below to illustrate it and its advantages.

Figure 2:
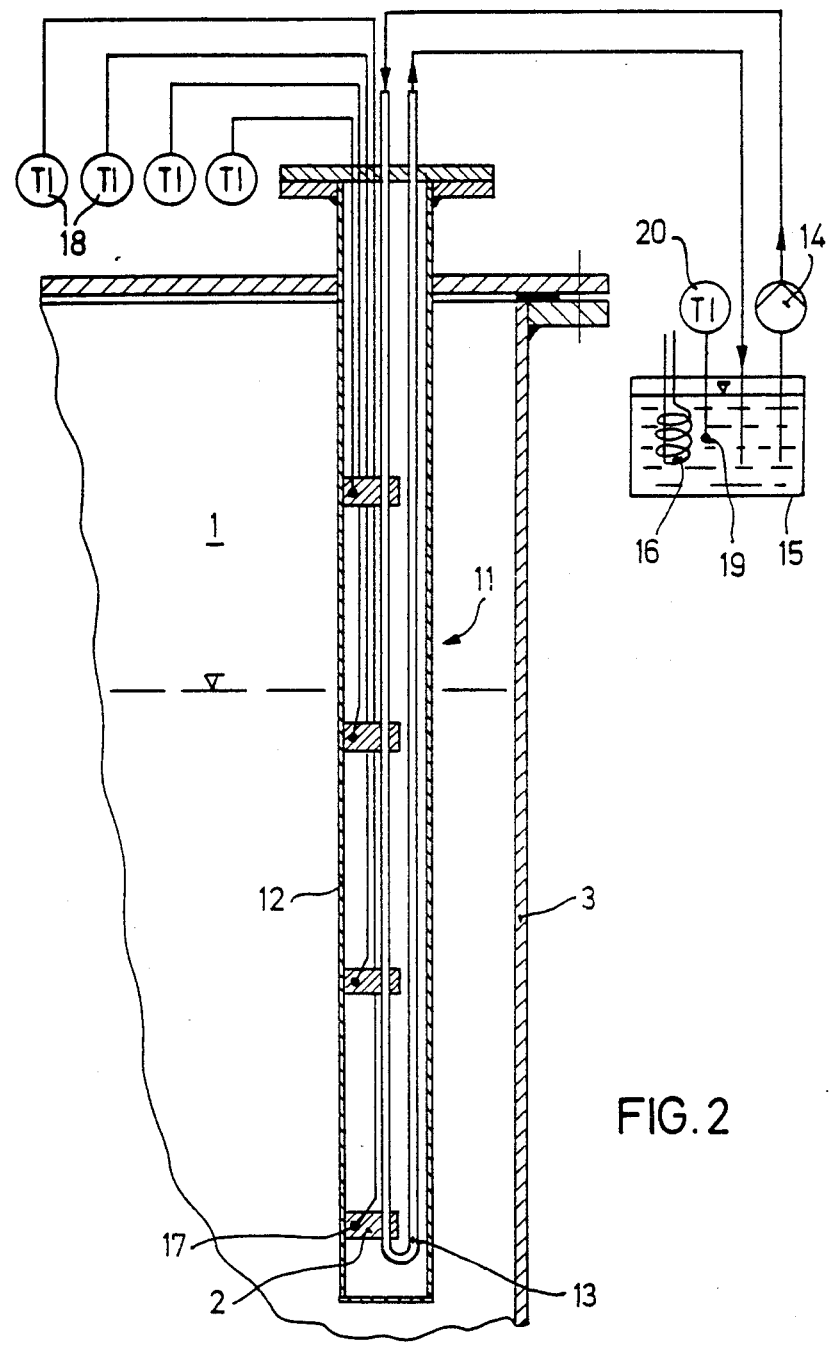

FIG. 1 of the drawings shows a section through a level-measuring apparatus inserted into the wall of a vessel which contains the liquid or charge to be monitored, and FIG. 2 shows a section through an arrangement of several measuring units in a probe tube, the arrangement being suitable for quasi-continuous level measurement.

At the point or points at which the level is to be monitored, a heat stream is fed via a heat-conducting element 2 into the interior of a vessel 1 which contains the liquid or the agitated solid charge. This heat stream, which can be produced by heating or cooling the element, undergoes a change as a result of the difference between the heat-transfer coefficient of the empty vessel space and that of the vessel space filled with liquid or solid, and this change can be used to measure the level. The change is determined by measuring the temperature of the element in the region of contact with the vessel content.

According to FIG. 1, this is done by means of a rod-like element 2 which consists of a material having a high thermal conductivity coefficient, e.g. copper, and is located in vessel wall 3, which serves as a partition. Outside the container, the element is connected, depending on the desired direction of heat flow, to either a heat source or a cold source 4, which can consist of, for example, an electrical heater or a heat exchanger which passes a heating or cooling medium through the element.

At the end in the vessel, element 2 is provided with a temperature sensor 5, for example a thermocouple or a temperature-dependent resistor, which is connected to a display 6. As soon as the part 7 of element 2 which projects into the interior of the vessel comes into contact with the liquid or the agitated charge whose level is to be monitored, the heat-transfer coefficient increases by a factor of 10–100 at the point of contact, so that the temperature display indicates a change.

This temperature change serves to indicate the level reached and, as a measured parameter, can be processed further as desired. The extent of the temperature change depends on the dimensions of element 2 and the amount of heat flow, i.e. the temperature difference between the vessel content and component 8 of the element, which is adjacent to the heat or cold source 4. The direction of heat flow and the value of the temperature difference are selected so that the measurement is not adversely affected even in the case of condensing, desubliming or polymerizing gases.

In a preferred embodiment of the novel measuring apparatus, component 8 of the heat-conducting element 2, which component is adjacent to the heat or cold source 4, is also provided with a temperature sensor 9 connected to display 10. Consequently, the temperature inside the vessel can be compared with that close to the heat source or cold source. This has the advantage that the heating or cooling effected by the heat source or cold source can be monitored and precisely regulated. This is required in certain circumstances in order to be certain that the temperature changes inside the vessel are attributable to the level in the vessel and not to variations in heating or cooling.

In another, advantageous embodiment of the measuring apparatus, several heat-conducting elements 2 are arranged at different levels over the height of the vessel, for quasi-continuous level measurement. These elements are once again arranged in the vessel wall 3 or, as shown in FIG. 2, are located in a probe tube 11 which can be dipped into the vessel 1 to be monitored. They are in intimate contact with tube wall 12 on the one hand, provided that the surfaces are carefully prepared, and with a heating or cooling medium cycle 13 on the other hand. This cycle is fed from a storage vessel 15 via a pump 14. The storage vessel can be heated or cooled to the desired extent by means of a heat exchanger 16 connected to a heat source or cold source. At the end adjacent to the tube wall, the elements are provided with temperature sensors 17, which are connected to individual displays 18. Another temperature sensor 19 associated with the heat source or cold source is located in storage vessel 16 and connected to display 20. Instead of the heating or cooling medium cycle, it is of course also possible to provide each element with an electrical heater or cooler, for example a thermoelectric cooler.

Two Examples based on a fluidized bed of sand and air are given below to illustrate more clearly the method described above and the apparatus.

EXAMPLE 1

Level measurement according to FIG. 1, by means of an electically heated copper element of 8 mm diameter and integral covered thermocouples of 1.5 mm diameter.

| | |
|---|---|
| Fluidized bed temperature: | 20° C. |
| Temperature of the element heater: | 70° C. |
| Temperature of the element component in the free space: | 34° C. |
| Temperature of the element component after immersion in the fluidized bed: | 26° C. |
| Rate of temperature decrease after immersion: | 3° C. min$^{-1}$ |

EXAMPLE 2

Level measurement by means of a probe tube according to FIG. 2.

Heating is effected by means of thermal oil, via a thermostat.

| | |
|---|---|
| Fluidized bed temperature: | 100° C. |
| Temperature of the thermal oil: | 115° C. |
| Temperature of the element in the free space: | 112° C. |
| Temperature of the element in the fluidized bed: | 107° C. |

We claim:

1. Apparatus for measuring the level of a liquid or an agitated charge in a vessel, comprising a plurality of spaced elements arranged vertically in a probe tube immersed in the vessel each said element consisting of heat-conducting material, each element being located at a different level over the height of the probe tube at which the liquid or charge lever is to be monitored, and each element having two ends and being in thermal contact with the interior of the probe tube on one end and with a fluid conduit on the other end, each said element being equipped, at the said one end with a temperature sensor connected to a display, and said fluid conduit connected to a source of heat or cold fluid said source located exterior of said vessel and also being provided with a fluid temperature sensor and fluid temperature display.

* * * * *